United States Patent
Evans et al.

(10) Patent No.: US 10,598,066 B2
(45) Date of Patent: Mar. 24, 2020

(54) SYSTEMS AND METHODS FOR INCREASING DIESEL EXHAUST FLUID DELIVERY CAPACITY

(71) Applicant: Robert Bosch GmbH, Stuttgart (DE)

(72) Inventors: Andrew Evans, White Lake, MI (US); Oliver Wintersteller, Howell, MI (US); Andres Murube Lindahl, Farmington Hills, MI (US); Palanimuthu Thalamuthu, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 15/751,564

(22) PCT Filed: Sep. 21, 2016

(86) PCT No.: PCT/EP2016/072400
§ 371 (c)(1),
(2) Date: Feb. 9, 2018

(87) PCT Pub. No.: WO2017/050814
PCT Pub. Date: Mar. 30, 2017

(65) Prior Publication Data
US 2018/0230880 A1    Aug. 16, 2018

Related U.S. Application Data

(60) Provisional application No. 62/232,134, filed on Sep. 24, 2015.

(51) Int. Cl.
*F01N 3/20* (2006.01)
*F01N 9/00* (2006.01)
*F01N 11/00* (2006.01)

(52) U.S. Cl.
CPC ........ *F01N 3/2066* (2013.01); *F01N 3/208* (2013.01); *F01N 9/00* (2013.01); *F01N 11/00* (2013.01);

(Continued)

(58) Field of Classification Search
CPC .... F01N 3/208; F01N 3/2066; F01N 2610/02; F01N 2610/144; F01N 2610/146;

(Continued)

(56) References Cited

U.S. PATENT DOCUMENTS

| 7,886,525 B2 | 2/2011 | Nishibu et al. |
| 2008/0148716 A1 | 6/2008 | Nishibu et al. |

(Continued)

FOREIGN PATENT DOCUMENTS

| CN | 103133164 A | 6/2013 |
| EP | 2730762 A1 | 5/2014 |

(Continued)

OTHER PUBLICATIONS

Machine translation of JP 2015-040494 A, accessed Aug. 1, 2019. (Year: 2019).*

(Continued)

*Primary Examiner* — Jonathan R Matthias
(74) *Attorney, Agent, or Firm* — Michael Best & Friedrich LLP (57) ABSTRACT

A diesel exhaust fluid (DEF) delivery system and method for operating same. The method includes controlling a pump to operate at an idle speed to pressurize a pressure line. The method includes controlling a backflow dosing module (BFDM) valve to open to allow an amount of the DEF to flow into a fluid storage tank through a backflow line. The method includes determining a dosing request, a first dosing actuation request for the first dosing valve and a second dosing actuation request for the second dosing valve based on the dosing request. The method includes, when a sum of the first and second dosing actuation requests is less than 100%, controlling the BFDM valve to close when either of the first and second dosing valves is open; and controlling the BFDM valve to open when the first dosing valve is closed and the second dosing valve is closed.

12 Claims, 11 Drawing Sheets

(52) U.S. Cl.
CPC ...... *F01N 2550/05* (2013.01); *F01N 2560/08* (2013.01); *F01N 2610/02* (2013.01); *F01N 2610/14* (2013.01); *F01N 2610/144* (2013.01); *F01N 2610/146* (2013.01); *F01N 2610/1446* (2013.01); *F01N 2610/1453* (2013.01); *F01N 2610/1473* (2013.01); *F01N 2900/1808* (2013.01); *F01N 2900/1821* (2013.01); *F01N 2900/1822* (2013.01); *Y02T 10/24* (2013.01); *Y02T 10/47* (2013.01)

(58) Field of Classification Search
CPC ..... F01N 2610/1446; F01N 2610/1473; F01N 2610/1493; F01N 2900/1808; F01N 2900/1821; F01N 2900/1822
See application file for complete search history.

(56) References Cited

U.S. PATENT DOCUMENTS

| | | | |
|---|---|---|---|
| 2012/0255282 A1* | 10/2012 | Nagata | F01N 3/208 60/274 |
| 2014/0165539 A1 | 6/2014 | Nagata | |
| 2014/0166141 A1 | 6/2014 | Golin et al. | |
| 2014/0238504 A1 | 8/2014 | Kregling et al. | |
| 2014/0325965 A1 | 11/2014 | Tuken et al. | |
| 2014/0334983 A1 | 11/2014 | Yang et al. | |
| 2015/0047321 A1 | 2/2015 | Cruz | |
| 2015/0196878 A1 | 7/2015 | Nunez et al. | |

FOREIGN PATENT DOCUMENTS

| | | |
|---|---|---|
| JP | S5754865 A | 4/1982 |
| JP | 2011127442 A | 6/2011 |
| JP | 2012102637 A | 5/2012 |
| JP | 5592759 B2 | 9/2014 |
| JP | 2015004360 A | 1/2015 |
| JP | 2015040494 A | 3/2015 |
| WO | 2014060313 A1 | 11/2013 |

OTHER PUBLICATIONS

Office Action from the Japanese Patent Office for Application No. 2018-513343 dated Feb. 27, 2019 (6 pages).
Office Action from the Korean Intellectual Property Office for Application No. 10-2018-7008319 dated Apr. 19, 2019 (7 pages).
International Search Report and Written Opinion for Application No. PCT/EP2016/072400 dated Dec. 21, 2016, (10 pages).
Office Action from the State Intellectual Property Office of the People's Republic of China for Application No. 201680055826.5 dated Aug. 5, 2019 (9 pages).

* cited by examiner

SYSTEMS AND METHODS FOR INCREASING DIESEL EXHAUST FLUID DELIVERY CAPACITY

FIELD

Embodiments of the invention relate to the field of automotive control systems.

BACKGROUND

Diesel exhaust fluid (DEF) is an aqueous urea solution that is used to lower NOx concentration in diesel exhaust emissions from diesel engines. Embodiments of the present invention relate to DEF delivery systems and mechanisms for controlling the fluid pressure within the system.

DETAILED DESCRIPTION

Governments are expanding emission requirements that diesel engine manufacturers reduce the emissions of NOx that result from diesel fuel combustion. Accordingly, powertrain systems have become more complex. Diesel Exhaust Fluid (DEF) delivery systems including Selective Catalytic Reduction (SCR) technologies have proven to be one of the more effective technologies for reducing NOx emissions while improving fuel economy. Legislative action continues to require manufacturers to achieve increased efficiency from these systems, resulting in higher diesel exhaust fluid consumption by diesel exhaust fluid delivery systems. Accordingly, there is a need for systems and methods for increasing diesel exhaust fluid delivery capacity.

In one embodiment, the invention provides a diesel exhaust fluid delivery system including a backflow dosing module. The system includes a first dosing valve controllable to deliver DEF to a diesel exhaust system; a second dosing valve controllable to deliver DEF to the diesel exhaust system, a fluid storage tank for storing DEF; a pump, coupled to the fluid storage tank and the first and second dosing valves, and controllable to pump DEF from the storage tank through a suction line to the first and second dosing valves through a pressure line; a pressure sensor positioned to sense a system pressure of the DEF delivery system; a backflow dosing module, including a backflow dosing module valve, coupled to the fluid storage tank to controllably allow an amount of the pumped DEF to flow back into the fluid storage tank through a backflow line; and an electronic controller, communicatively coupled to the first and second dosing valves, the pump, the backflow dosing module, and the pressure sensor. The electronic controller is configured to control the pump to operate at idle speed to pressurize the pressure line. The electronic controller is configured to control the first and second dosing valves to close by default. The electronic controller is configured to control the backflow dosing module valve to open by default. The electronic controller is configured to determine a dosing request. The electronic controller is configured to determine a first dosing actuation request for the first dosing valve based on the dosing request. The electronic controller is configured to determine a second dosing actuation request for the second dosing valve based on the dosing request. The electronic controller is configured to, when a sum of the first and second dosing actuation requests is less than 100%: control the first and second dosing valves to open and close based on the first and second dosing valve actuation requests, control the backflow dosing module valve to close when either of the first and second dosing valves is open, and control the backflow dosing module valve to open when the first dosing valve is closed and the second dosing valve is closed.

In another embodiment the invention provides a method for operating a diesel exhaust fluid delivery system. The method includes controlling, with an electronic processor, a pump to operate at an idle speed to pressurize a pressure line and pump DEF from a fluid storage tank through a suction line to a first dosing valve and a second dosing valve through the pressure line. The method includes controlling, with the electronic processor, a backflow dosing module valve to open to allow an amount of the DEF to flow into a fluid storage tank through a backflow line. The method includes determining a dosing request. The method includes determining a first dosing actuation request for the first dosing valve based on the dosing request. The method includes determining a second dosing actuation request for the second dosing valve based on the dosing request. The method includes, when a sum of the first and second dosing actuation requests is less than 100%: controlling the first and second dosing valves to open and close based on the first and second dosing valve actuation requests; controlling the backflow dosing module valve to close when either of the first and second dosing valves is open; and controlling the backflow dosing module valve to open when the first dosing valve is closed and the second dosing valve is closed.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1A:
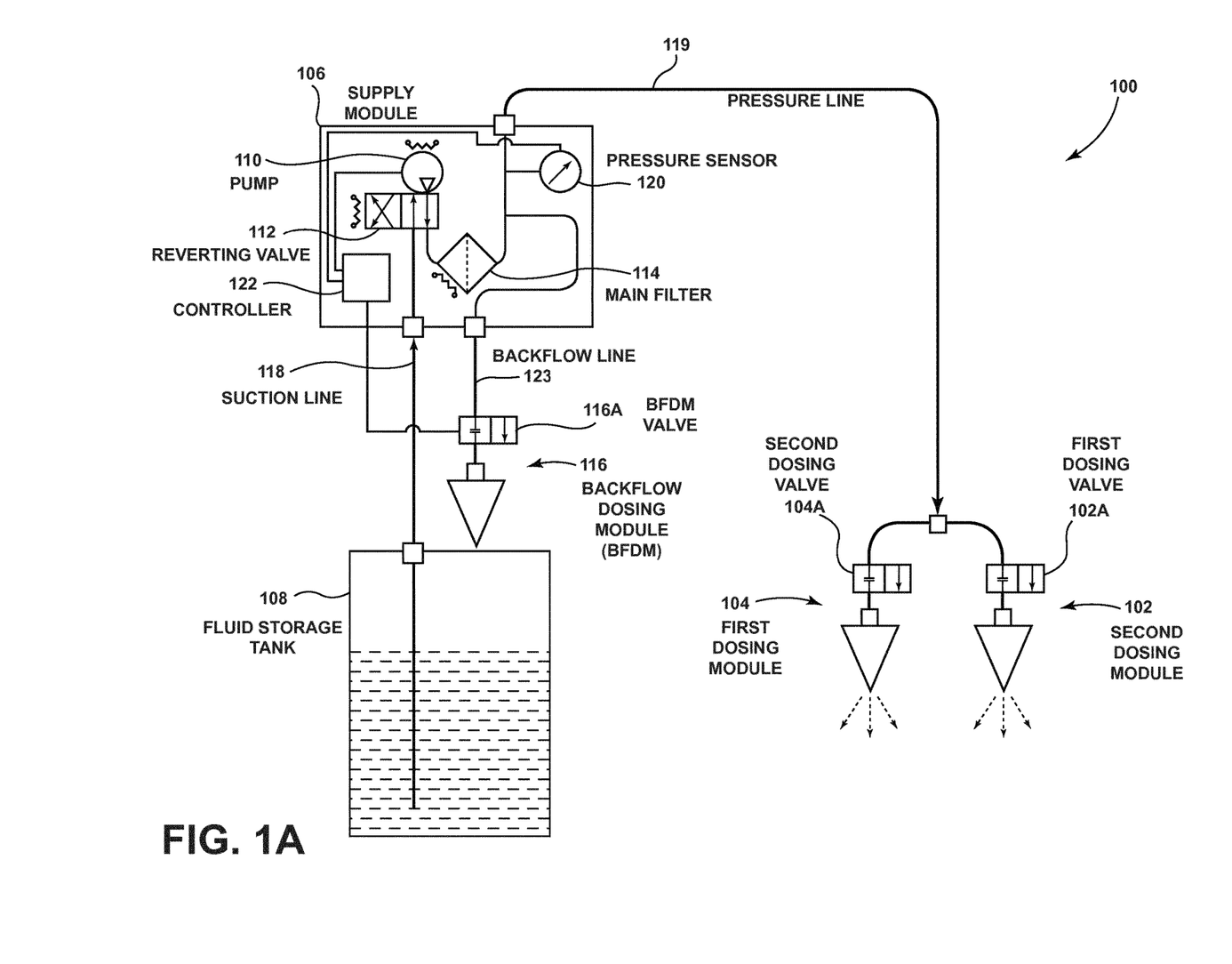
FIG. 1A is a block diagram of a diesel exhaust fluid delivery system including a backflow dosing module, according to some embodiments.

FIG. 1A is a block diagram of an exemplary embodiment of a DEF delivery system 100. The system 100 includes a first dosing module 102 and a second dosing module 104 for delivering DEF to an exhaust system for a diesel engine (not shown) and a supply module 106 for moving DEF from a fluid storage tank 108 to the first dosing module 102 and the second dosing module 104 at a desired, variable pressures and mass delivery flow rates. The first dosing module 102 and the second dosing module 104 include a first dosing valve 102A, and a second dosing valve 104A, respectively. The dosing valves are on-off valves, which controllably open and close to deliver (e.g., inject) a quantity of DEF into the exhaust system when the system is pressurized, as described in detail below. Alternative embodiments may have a single dosing module, or may have more than two.

The supply module 106 includes a pump 110, a reverting valve 112, a main filter 114, a backflow dosing module (BFDM) 116, a pressure sensor 120, and an electronic controller 122. The pump 110, the reverting valve 112, the main filter 114, the backflow dosing module (BFDM) 116, the pressure sensor 120, and the electronic controller 122, as well as other various modules and components of the DEF delivery system 100, are coupled to each other by or through one or more control or data buses, which enable communication therebetween. The use of control and data buses for the interconnection between and exchange of information and control signals among the various modules and components would be apparent to a person skilled in the art in view of the description provided herein.

The pump 110 draws DEF from the fluid storage tank 108 through a suction line 118 and provides the DEF to the first dosing module 102 and the second dosing module 104 through a pressure line 119. The reverting valve 112 is a controllable on-off valve. When the reverting valve 112 is in an off state, the DEF from the fluid storage tank 108 is supplied to the first dosing module 102, the second dosing module 104, and the backflow dosing module 116. When the reverting valve 115 is in an on state, the DEF in the first dosing module 102, the second dosing module 104, the backflow dosing module 116, the suction line 118, and the pressure line 119 is reverted to the fluid storage tank 108.

The backflow dosing module 116 is a DEF dosing module, similar to the first dosing module 102 and the second dosing module 104. The backflow dosing module 116 includes a backflow dosing module valve 116A, which is an on-off valve. The backflow dosing module 116 is coupled to the fluid storage tank 108, and controllably allows a quantity of the pumped DEF to flow back into the fluid storage tank 108 through backflow line 123. In a preferred embodiment, the mass flow rate (i.e., the quantity of DEF passed through the BFDM 116 each second when the BFDM valve 116A is open) for the backflow dosing module 116 exceeds the minimum DEF delivery capacity of the pump 110.

The pressure sensor 120 senses pressure in the DEF system, and transmits the sensed pressure to the electronic controller 122.

The electronic controller 122 includes an electronic processing unit (e.g., a processor, microprocessor or another suitable programmable device), a memory, and an input/output interface. The electronic processing unit, the memory, and the input/output interface, along with other various modules and components, are coupled to each other by or through one or more control or data buses that enable communication therebetween. The memory may include read-only memory (ROM), random access memory (RAM), other non-transitory computer-readable media, or a combination thereof. The electronic processing unit is configured to retrieve instructions and data from the memory and execute, among other things, instructions to perform the methods described herein. The input/output interface is configured to receive input and to provide output. The input/output interface obtains information and signals from, and provides information and signals to (for example, over one or more wired and/or wireless connections), devices both internal and external to the electronic controller 122. In some embodiments, the electronic controller 122 is implemented partially or entirely on a semiconductor (e.g., a field-programmable gate array ["FPGA"] semiconductor) chip.

Figure 1B:
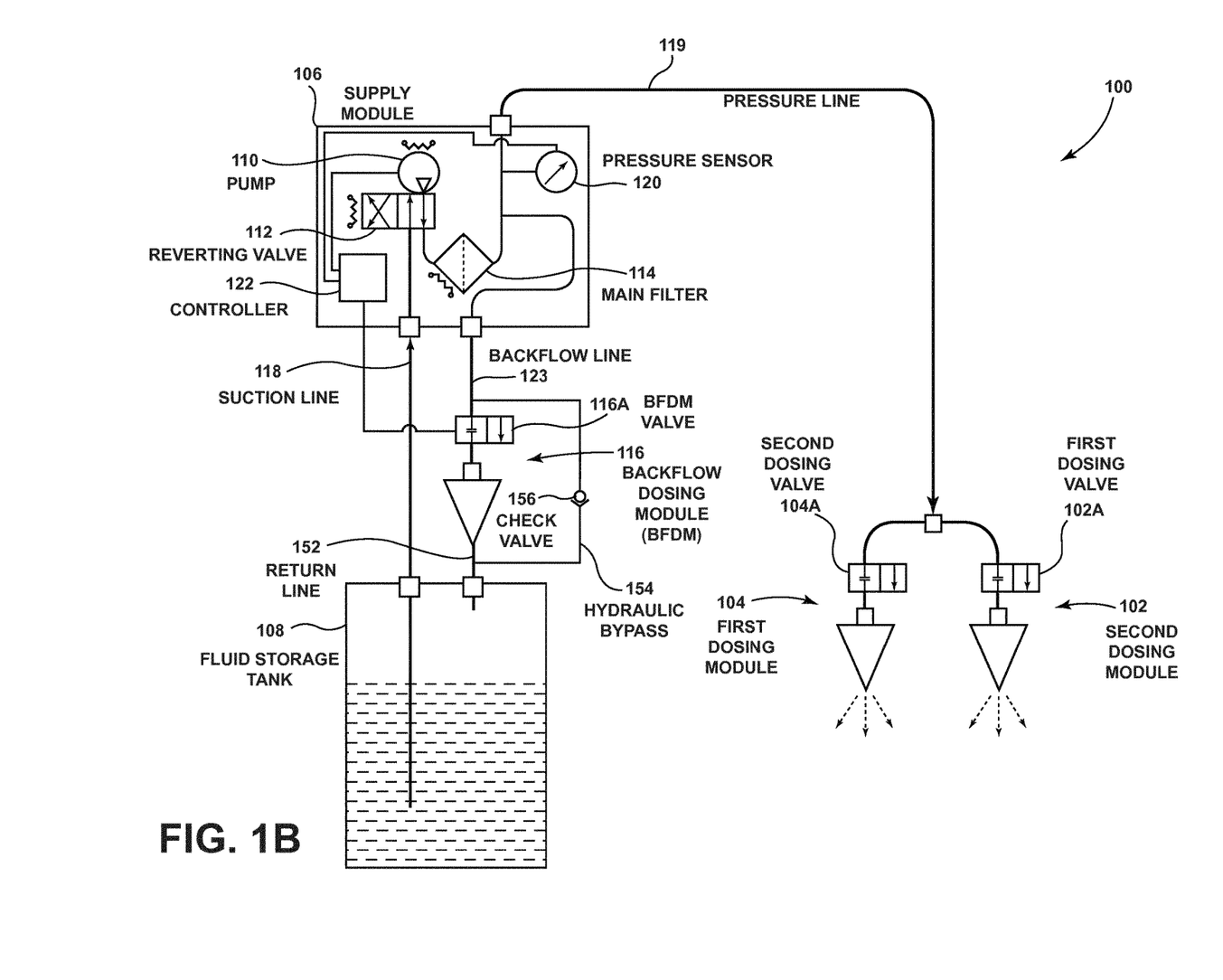
FIG. 1B is a block diagram of a diesel exhaust fluid delivery system including a backflow dosing module, according to some embodiments.

FIG. 1B is a block diagram of an exemplary embodiment of a second DEF delivery system 150. The DEF delivery system 150 illustrated in FIG. 1B includes similar components and is configured similarly to the DEF delivery system 100 illustrated in FIG. 1A, described above. However, the backflow dosing module 116 in the DEF delivery system 150 is not directly coupled to the fluid storage tank 108, but is rather coupled indirectly via a return line 152. This allows the backflow dosing module 116 to be mounted in locations apart from the fluid storage tank 108. A hydraulic bypass 154 may include a device (e.g., a check valve 156) for regulating the flow of DEF around the backflow dosing module 116. The hydraulic bypass 154 has a higher flow rate than the backflow dosing module 116. As such, it should be noted that a plurality of hardware and software based devices, as well as a plurality of different structural components may be utilized to implement the invention to empty the lines.

Figure 2:
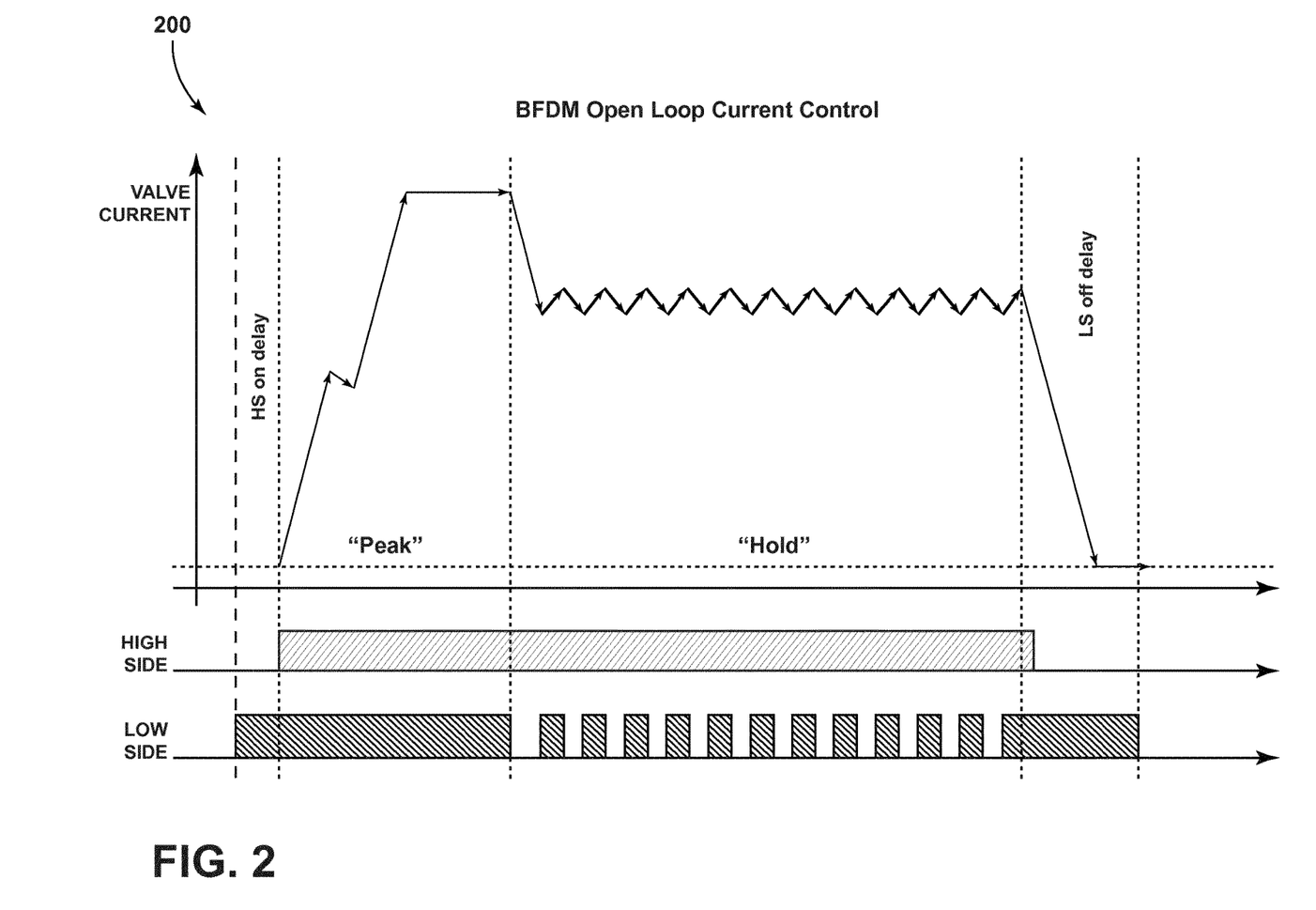
FIG. 2 is a chart illustrating an open loop current control method for the backflow dosing module of FIGS. 1A and 1B, according to some embodiments.

The mass flow rate of proportional valves can be influenced by temperature. To mitigate this problem, proportional valves are closed-loop current controlled to ensure the desired mass flow. However, on-off valves, such as the BFDM valve 116A, experience minimal effects on mass flow rate due to temperature. Accordingly, in some embodiments, the electronic controller 122 utilizes a current control strategy for opening the backflow dosing module valve 116A. FIG. 2 illustrates an exemplary current control strategy in a chart 200. The BFDM valve 116A includes an actuator (e.g., a solenoid) (not shown). As illustrated in the chart 200, the electronic controller 122 controls the BFDM valve 116A to open by energizing the actuator with a peak current for a peak period and energizing the actuator with a hold current (e.g., an open loop pulse-width modulated current) for a hold period. As illustrated in the chart 200, the "Peak" current is the minimum current for required for opening the BFDM valve 116A. Once the BFDM valve 116A has been opened, the electronic controller 122 can reduce the current to the minimum level that keeps the valve in the open position (the "Hold" level illustrated in FIG. 2). Reducing to the hold level reduces power losses and thermal loading of the valve and controller. The chart 200 also illustrates the corresponding duty cycles for the high side (HS) and low side (LS) of the actuator during the Peak and Hold phases of opening the BFDM valve 116A.

Figure 3:
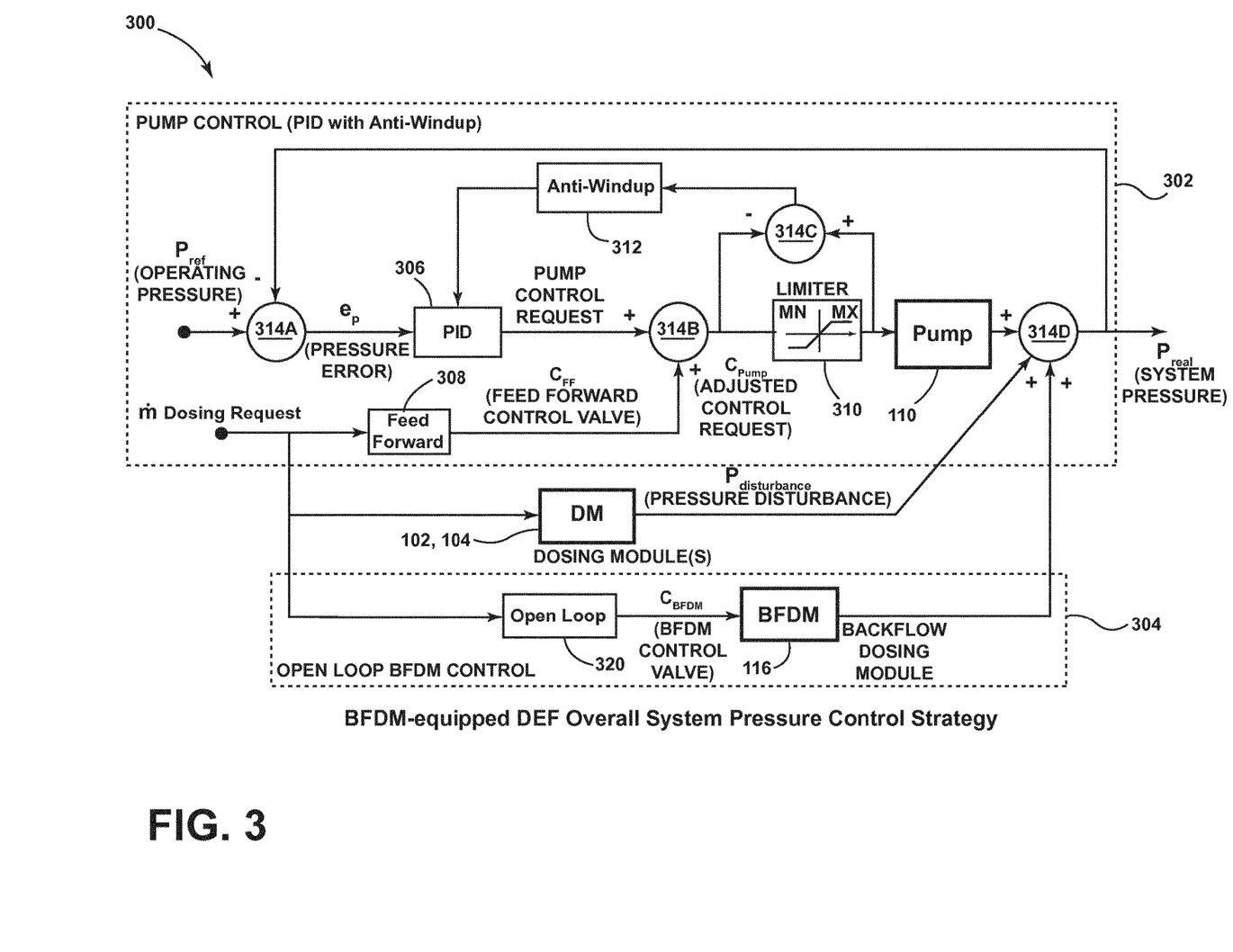
FIG. 3 is a schematic diagram illustrating a feed-forward pressure control system for the diesel exhaust fluid delivery systems of FIGS. 1A and 1B, according to some embodiments.

FIG. 3 illustrates an exemplary embodiment of a feed forward pressure control system 300 for a diesel exhaust fluid delivery system equipped with a backflow dosing module (for example, the DEF delivery systems 100 and 150 of FIGS. 1A and 1B). As illustrated in FIG. 3, embodiments of the invention are Multiple Input, Single Output (MISO) systems. Multiple control variables, for example, the pump 110, the dosing modules 102 and 104, and the BFDM 116, affect a single system output, for example, the system pressure. As illustrated in FIG. 3, the pump 110 is operated in a closed loop pump control 302 to regulate the system pressure, while the BFDM 116 is actuated in an open loop control 304 to regulate the system pressure. For ease of description, FIG. 3 illustrates the feed forward pressure control system 300 using both functions, which may be implemented in hardware and software, and hardware components of the DEF delivery system.

In one embodiment, the functions (e.g., the proportional-integral-derivative (PID) control 306, the feed forward control 308, the limiter 310, the anti-windup control 312, summing nodes 314A, 314B, 314C, 314D, and open loop control 320) are implemented by the electronic controller 122 (using software, hardware, or a combination of both). The methods described herein may be used to control both the pump 110 and the BFDM 116 to regulate pressure within the DEF delivery systems 100 and 150. The systems and methods described herein apply to controlling the pump 110, the BFDM 116, and the first and second dosing valves 102A, 104A. Data values (for example, the dosing request and the feed forward control value) or control signals (for example, the control request and the adjusted control request), are transmitted from, received by, or operated on by, the functions and components, as illustrated in FIG. 3, and described more particularly with respect to FIGS. 4A, 4B, 9, and 10, and the methods 400, 900, and 1000, below.

It is desirable to operate a DEF delivery system as near as possible to a particular pressure (for example, 9 kHPa) to achieve a desired spray pattern for the DEF within the exhaust system. However, the operation of the components (e.g., the dosing modules 102, 104) can create a step change disturbance, which generates negative pressure spikes within the system. These pressure spikes influence mechanical wear of the components and reduce the efficiency of a DEF delivery system's NOx reduction (for example, by affecting the spray pattern of the diesel exhaust fluid). Accordingly, as described in detail below, the electronic controller 122 is configured to compensate for these pressure disturbances.

Figure 4A:
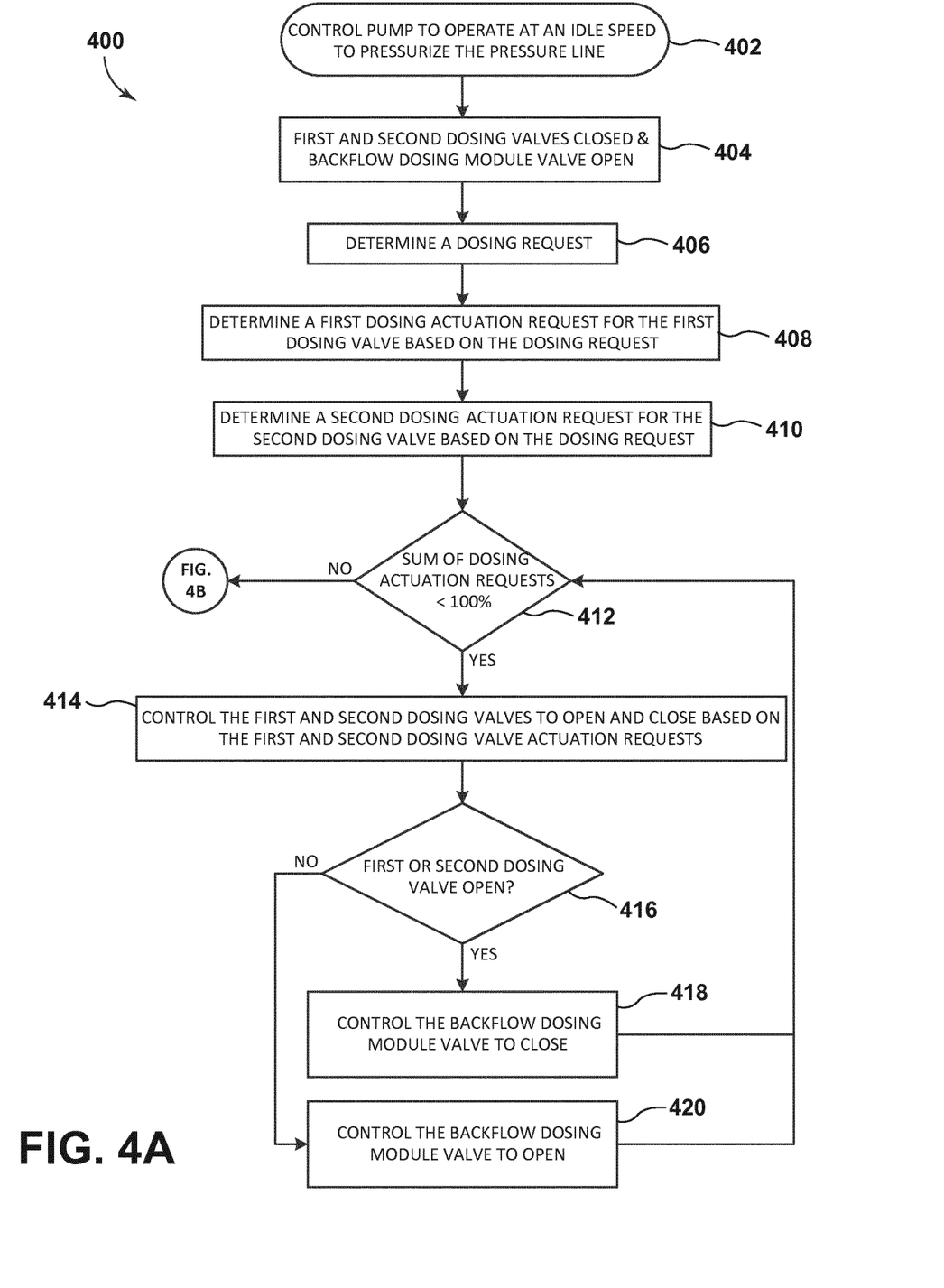
FIGS. 4A and 4B are a flowchart illustrating a method for operating a diesel exhaust fluid delivery system including a backflow dosing module, according to some embodiments.
Figure 4B:
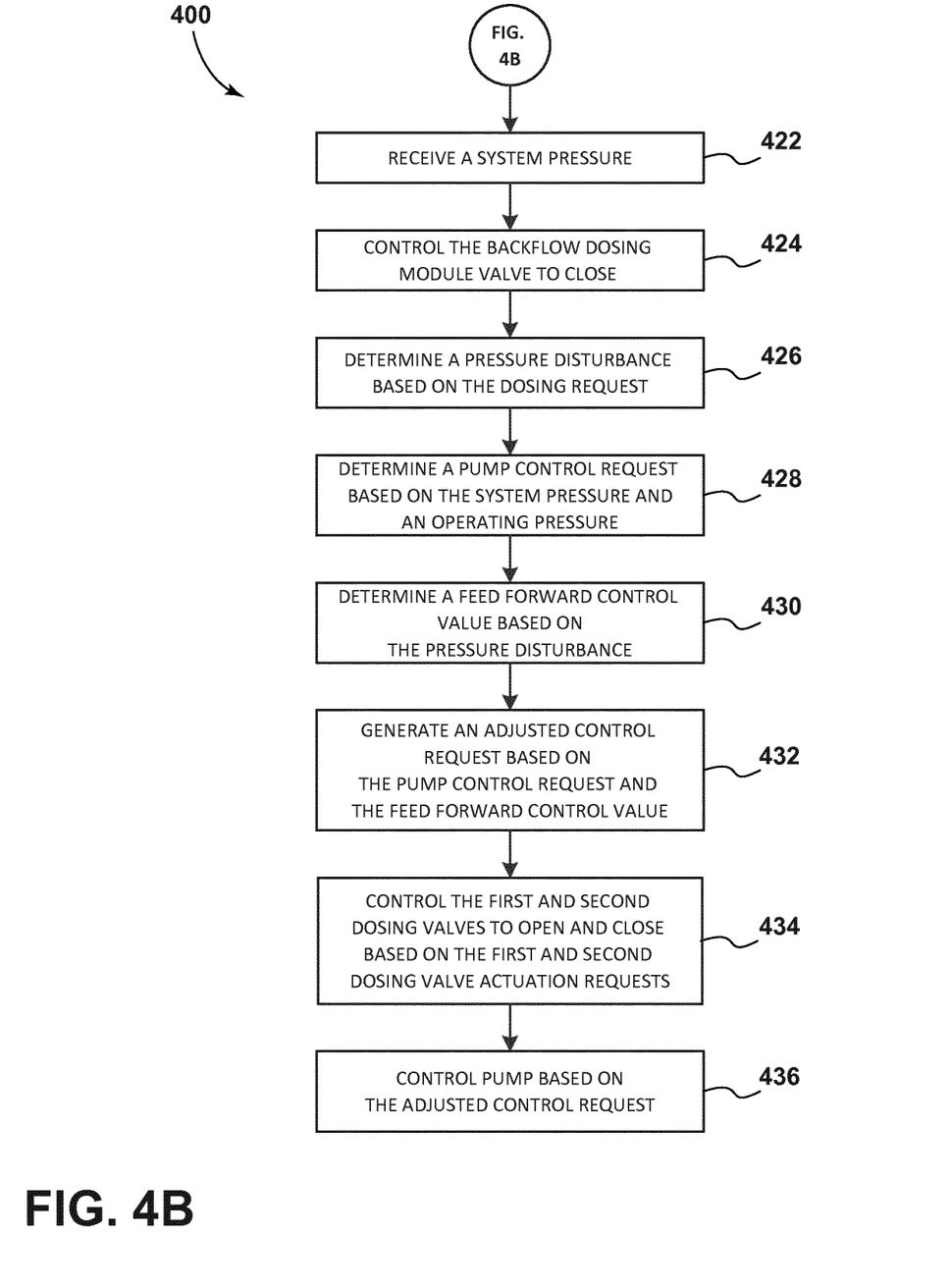

FIGS. 4A and 4B illustrate an exemplary method 400 for operating a diesel exhaust fluid delivery system including a backflow dosing module. As an example, the method 400 is described in terms of the DEF delivery system 100. The method 400 may also be used to control the DEF delivery system 150, as well as other DEF delivery systems that include a backflow dosing module 116. The description of the method 400 assumes a predetermined operating pressure for the DEF delivery system 100. As noted above, it is desirable to operate the DEF delivery system 100 as near as possible to a desired operating pressure to achieve a desired spray pattern for the diesel exhaust fluid within the exhaust system. In some embodiments, the operating pressure is determined prior to the system's operation, stored in a memory of the electronic controller 122 and retrieved. In some embodiments, the operating pressure may be determined by the electronic controller 122 at the time of operation based on the operational or environmental factors. As an example, the method 400 is described in term of the operating pressure being 9 kHPa. However, the methods described herein could be implemented using other operating pressures.

The electronic controller 122, using the method 400, controls the components of the DEF delivery system 100 reduce the variation in the system operating pressure. Reducing variation in the operating pressure may be accomplished by balancing the mass flow of the diesel exhaust fluid (i.e., attempting to equalize the mass flow from the tank with the mass flow to the tank and into the exhaust system). The following equations illustrate how the mass flow may be balanced.

For example, the mass flow rate when there is no dosing request ($k_1$), the mass flow through the BFDM 116 to the fluid storage tank 108 ($\dot{m}_{Backflow}$), and the mass flow the fluid storage tank 108 ($\dot{m}_{Suction}$) will be equal.

$$\cancel{\dot{m}_{Dosing}} + \dot{m}_{Backflow} = \dot{m}_{Suction} = k_1$$

In another example, when there is a dosing request, the BFDM valve 116A is closed, and the mass flow rate ($k_2$), the mass flow from the fluid storage tank 108 ($\dot{m}_{Suction}$), and the mass flow through the first and second dosing modules 102, 104 ($\dot{m}_{Dosing}$) will be equal.

$$\dot{m}_{Dosing} + \cancel{\dot{m}_{Backflow}} = \dot{m}_{Suction} = k_2$$

As shown in the equation below, ideally, there will be no change in mass flow rate (mass flow rate $k_1$ is equal to $k_2$) when the BFDM 116 and the first and second dosing modules 102, 104 have the same mass flow rate.

$$k_1 = k_2 \rightarrow \dot{m}_{Suction} = \dot{m}_{Dosing} = \dot{m}_{Backflow}$$

At block 402, the electronic controller 122 controls the pump 110 to operate at an idle speed to pressurize the pressure line 119 and to pump DEF from the fluid storage tank 108 through the suction line 118 to the first dosing valve 102A and the second dosing valve 104A through the pressure line 119. At block 404, the electronic controller 122 controls the first and second dosing valves 102A, 104A to close, and the backflow dosing module valve 116A to open. During operation of the DEF delivery system 100, the electronic controller 122 controls the first and second dosing valves 102A, 104A to close by default, and controls the backflow dosing module valve 116A to open by default.

At block 406, the electronic controller 122 determines a dosing request. The dosing request is a request for an amount of diesel exhaust fluid, or mass flow rate, which will injected into the diesel exhaust system. Determining a dosing request is known in the art, and will not be described in detail. At block 410, the electronic controller 122 determines a first dosing actuation request for the first dosing valve, and a second dosing actuation request for the second dosing valve. The first and second dosing actuation requests are duty cycles for the first and second dosing valves, and are based on the dosing request.

At block 412, the electronic controller 122 determines whether the sum of the first and second dosing actuation requests is less than 100%.

At block 414, when the sum of the first and second dosing actuation requests is less than 100%, the electronic controller 122 controls the first and second dosing valves to open and close based on the first and second dosing valve actuation requests. At block 416, the electronic controller 122 determines whether either the first dosing valve 102A or the second dosing valve 104A is open (i.e., injecting DEF into the exhaust system). At block 418, the electronic controller controls the backflow dosing module valve 116A to close when either of the first and second dosing valves 102, 104 is open. At block 420, the electronic controller 122 controls the backflow dosing module valve 116A to open when the first dosing valve 102A is closed and the second dosing valve 104A is closed. During operation of the DEF delivery system 100, while the sum of the dosing actuation requests is below 100%, the electronic controller 122 repeats blocks 414 through 420, as illustrated in FIG. 4A.

Figure 5:
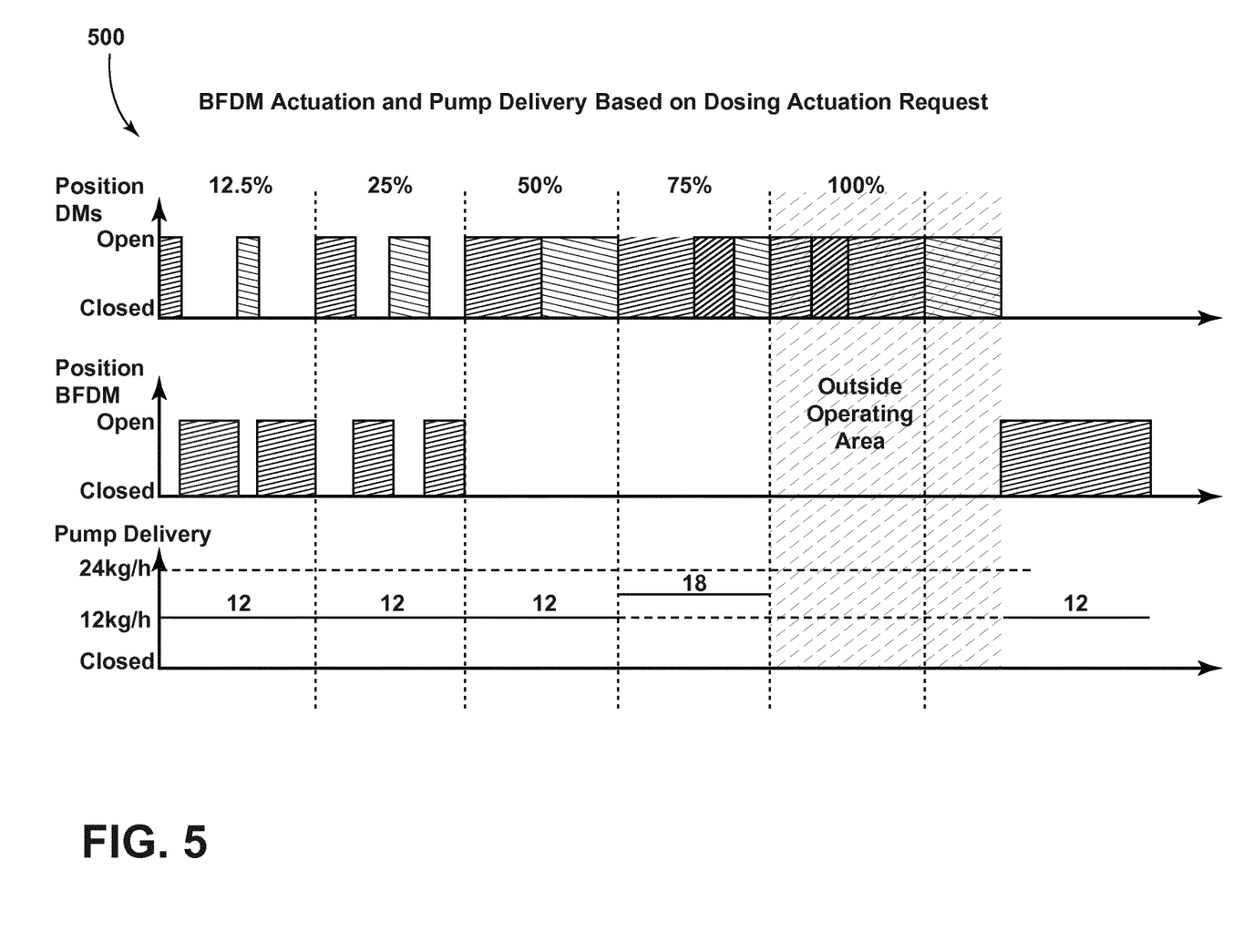
FIG. 5 is a chart illustrating backflow dosing module actuation, backflow dosing module actuation, and pump delivery of diesel exhaust fluid, according to some embodiments.

FIG. 5 is a chart 500 illustrating backflow dosing module actuation, backflow dosing module actuation, and pump delivery of diesel exhaust fluid, according to blocks 414 through 420 above. FIG. 5 illustrates the operation of the method 400 for different dosing and actuation requests of the DEF delivery system 100. As illustrated, the BFDM 116 is controlled to open when both the first dosing module 102 or second dosing module 104 are closed, and to close when either the first dosing module 102 or second dosing module 104 is open.

As illustrated in FIG. 5, for higher dosing requests (e.g., where either one or both the first or second dosing modules 102, 104 are open constantly), the BFDM 116 is not capable of influencing the system pressure anymore, and remains closed. Turning now to FIG. 4B, at block 414 (see FIG. 4A), when the sum of the first and second dosing actuation requests is greater than or equal to 100%, the electronic controller 122 receives the system pressure from the pressure sensor 120 at block 422. At block 424, the electronic controller 122 controls the backflow dosing module valve 116A to close. At block 426, the electronic controller 122 determines an expected pressure disturbance ($P_{disturbance}$) based on the dosing request. The value of $P_{disturbance}$ for a given dosing request (and, consequently, given first and second dosing requests) may be determined experimentally. Accordingly, a range of values for $P_{disturbance}$ can be determined for the range of dosing requests for a given configuration of the DEF delivery system 100. In some embodiments, the range of dosing requests and corresponding $P_{disturbance}$ values is stored in the memory of the electronic controller 122. In other embodiments, a mathematical model may be developed (based on, for example, experimental data and the configuration of the DEF delivery system 100) and used by the electronic controller 122 to determine the value of $P_{disturbance}$ based on the dosing request.

At block 428, the electronic controller 122 determines a pump control request based on the system pressure ($P_{real}$) and the operating pressure ($P_{ref}$). As illustrated in FIG. 3, $P_{real}$ and $P_{ref}$ are fed into summing node 314A, which subtracts $P_{real}$ from $P_{ref}$ and feeds that value (i.e., the pressure error ep to the PID control 306, which determines the pump control request. The pump control request sets the duty cycle of the pump 110. For example, when the system is operating at the desired pressure, no change would be needed and the pump control request would not change the duty cycle of the pump 110 ($P_{ref}-P_{real}=0$). Likewise, the pump control request decreases the duty cycle of the pump 110 when $P_{ref}$ is higher than $P_{real}$, and increases the duty cycle when $P_{real}$ is lower than $P_{ref}$.

Returning now to FIG. 4B, at block 430, the electronic controller 22 determines a feed forward control value ($C_{FF}$) based on $P_{disturbance}$, as determined at block 426. As illustrated in FIG. 3, the feed forward control value will be used by the electronic controller 122 to modify the pump control request determined at block 428 to account for the value of $P_{disturbance}$ anticipated when first and second dosing valves 102A, 104A are operating according the first and second dosing actuation requests determined at blocks 408 and 410. To reduce the effect of the dosing valve actuation on the $P_{real}$, the pressure produced by the pump ($P_{pump}$) and the $P_{disturbance}$ should cancel out: $P_{disturbance}+P_{pump}=0$. The feed forward control value is the value, which, when applied to the control request, makes the equation $P_{disturbance}+P_{pump}=0$ true. In some embodiments, the feed forward control value is determined as described in U.S. patent application Ser. No. 15/224,103).

Returning now to FIG. 4B, at block 432, the electronic controller 122 generates an adjusted control request ($C_{Pump}$) by combining the feed forward control value ($C_{FF}$) and the control request at summing node 314B (See FIG. 2). At block 434, the electronic controller 122 controls (operates) the first and second dosing valves 102A, 104A to open and close based on the first and second dosing actuation requests (determined at block 408), while, at block 436, controlling the pump 110 based on the adjusted control request (generated at block 432).

As illustrated in FIG. 3, in some embodiments, the feed forward pressure control system 300 includes a limiter 310 and an anti-windup control 312 to prevent integral windup errors from developing. In such embodiments, the electronic controller 122 generates a constrained control request based on the adjusted control request, an upper boundary, and a lower boundary (e.g., feasible bounds of operation for the pump 110). For example, the limiter 310 adjusts the adjusted control request to bound it between an upper boundary and a lower boundary. When the adjusted control request is below the lower boundary, the limiter 310 sets it to the lower boundary. When the adjusted control request exceeds the upper boundary, the limiter 310 sets it to the upper boundary. When the adjusted control request is between the upper and lower boundary, the limiter 310 does not alter the adjusted control request. The electronic controller 122 controls the pump based on the constrained control request.

When the anti-windup control 312, the PID control 306 determines the pump control request based on the system pressure, the operating pressure, and an anti-windup value. The limiter 310 and the anti-windup control 312 determine an anti-windup value based on the adjusted control request $C_{Pump}$, the upper boundary, and the lower boundary (e.g., feasible bounds of operation for the pump 110). For example, the adjusted control request and the constrained control request are fed to the summing node 314C, where they are combined and fed to the anti-windup control 312, which uses the result to back-calculate the integral term (i.e., the anti-windup value), which is fed to the PID control 306.

As represented by summing node 314D (See FIG. 3), the pressure change from the BFDM 116, combined with the pressure disturbance ($P_{disturbance}$) caused by the operation of the first and second dosing valves 102A, 104A, may effect a change in the system pressure ($P_{real}$).

Through the use of the feed forward pressure control system 300 and the method 400, the change to $P_{real}$ is reduced over DEF delivery system 100 operating without a feed forward control. The feed forward pressure control system 300 and the method 400 work to improve the maximum lifetime of the pump 110, while achieving a robust performance and a fast reaction time. In exemplary embodiments, the pump 110 will run at low (e.g., idle) speed until higher dosing amounts are requested. The BFDM 116 will have "n−1" more times actuations than a dosing module, where "n" is the number of dosing modules in the system. This should be considered when selected the appropriate valve for the BFDM 116.

The BFDM 116 mass flow should ideally be the same as the first and second dosing modules 102, 104 to have minimal impact on the operating pressure of the DEF delivery system 100. However, the control strategy is still applicable in systems where the BFDM 116 mass flow is less than the mass flow of the first and second dosing modules 102, 104. In such case, the BFDM 116 mass flow should be higher than the minimum delivery capability of the pump 110, and the feed forward control must be implemented over the entire operation range because the pressure drop caused by the opening of the first and second dosing modules 102, 104 will not be fully compensated by the BFDM 116.

Figure 6:
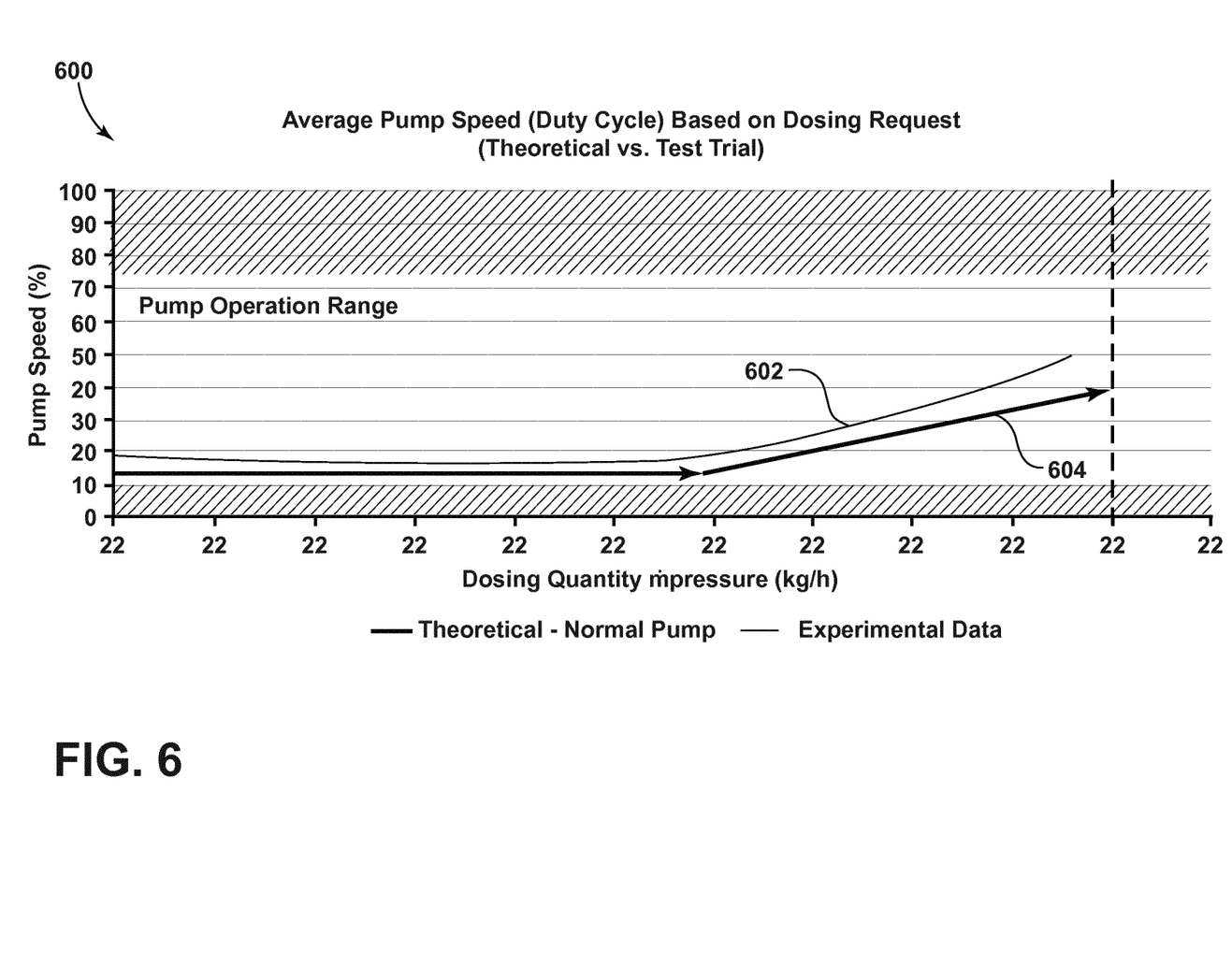
FIG. 6 is a chart comparing a theoretical pump duty cycle to experimental data, according to some embodiments.

FIG. 6 illustrates a chart 600 comparing a theoretical pump duty cycle (line 602) to experimental data (line 604). As illustrated in FIG. 6, the experimental results show that the feed forward pressure control system 300 and the method 400 operate substantially as predicted. The pump 110 is able to operate in a low duty cycle across a range of dosing requests, up to 12 kg/h.

Figure 7:
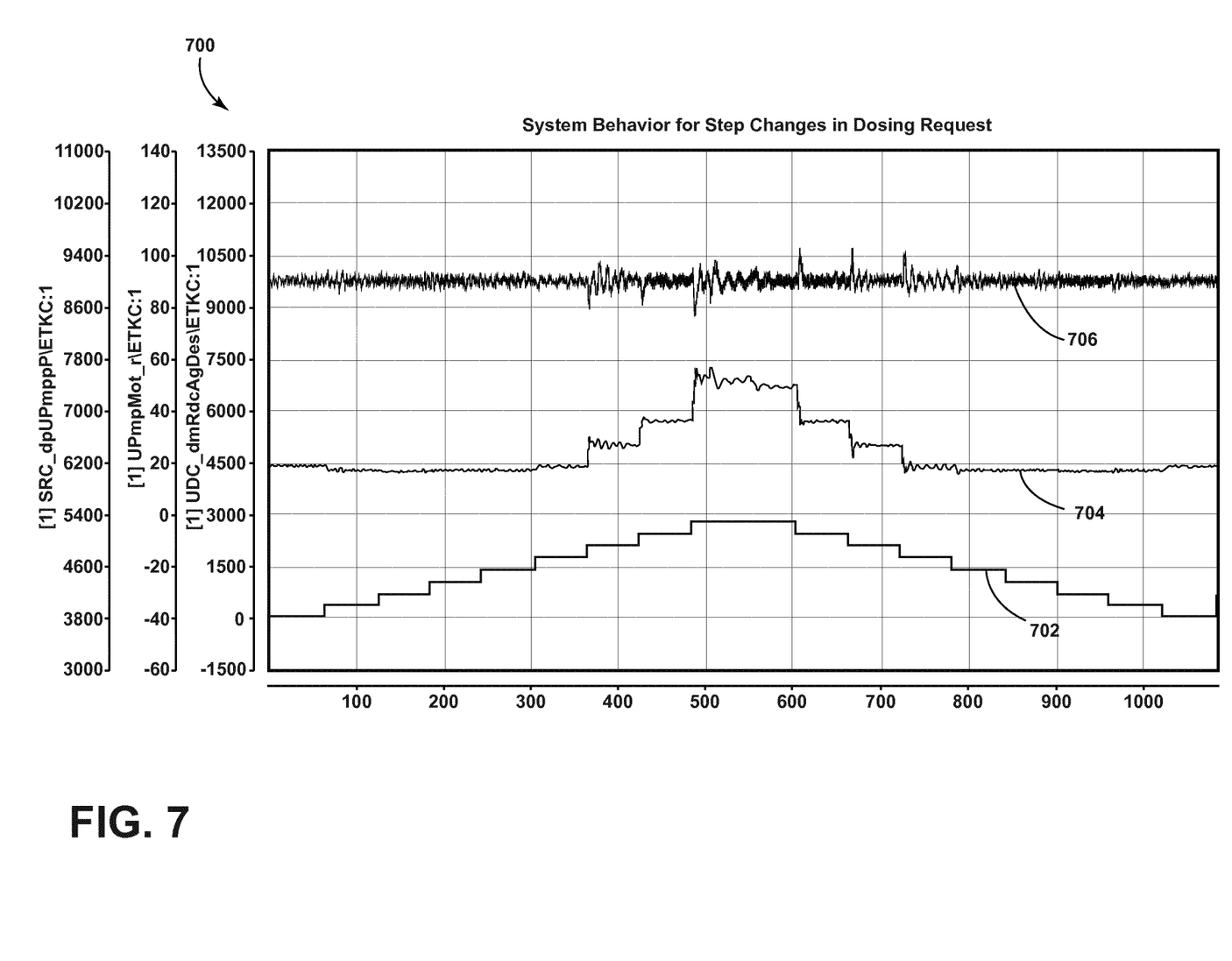
FIG. 7 is a chart illustrating diesel exhaust fluid system pressure and pump speed for step changes in a dosing request over time, according to some embodiments.
Figure 8:
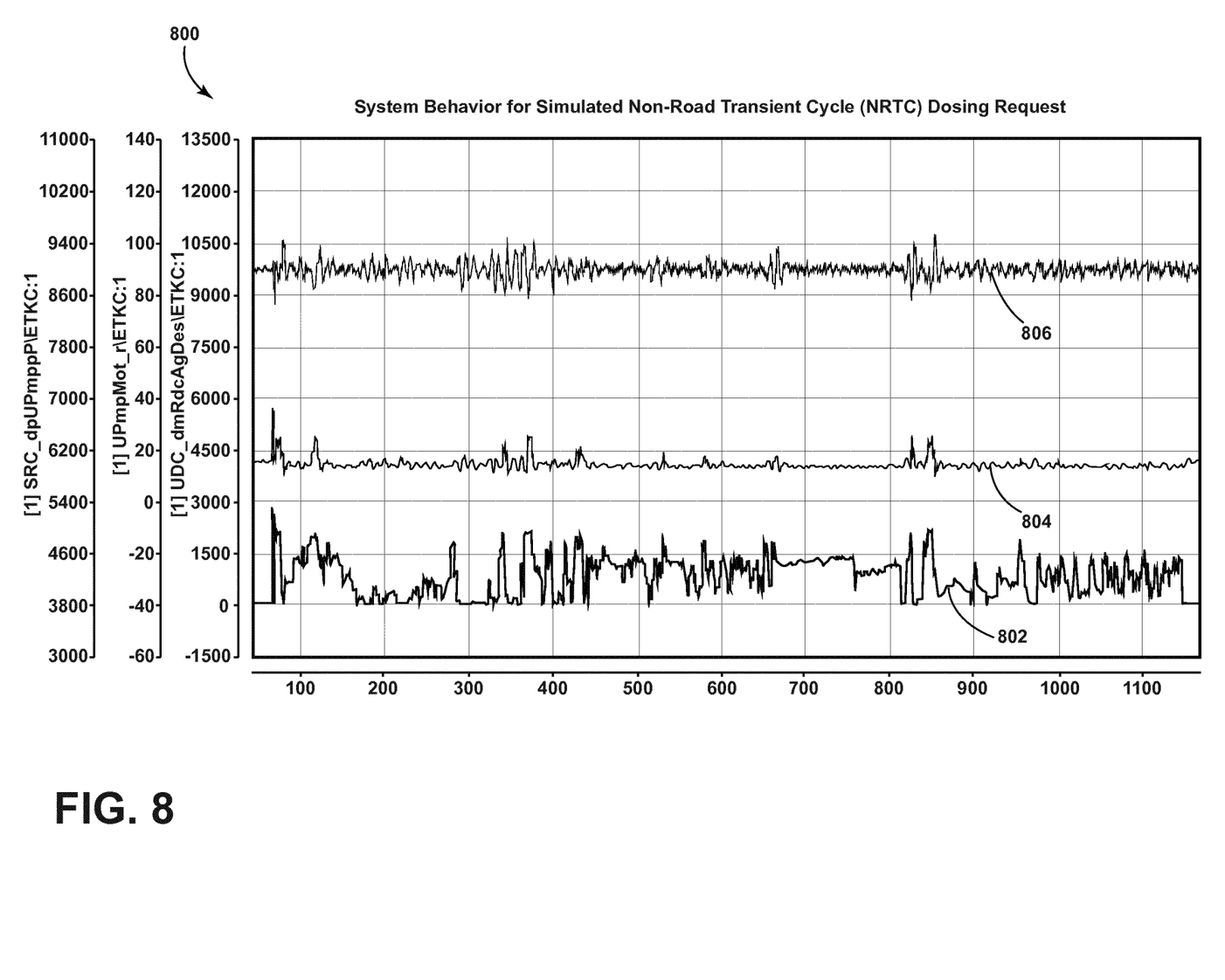
FIG. 8 is a chart illustrating diesel exhaust fluid system pressure and pump speed a simulated dosing request over time, according to some embodiments.

FIG. 7 illustrates a chart 700 showing step changes in a dosing request over time (line 702) and the resulting pump speed (line 704) and diesel exhaust fluid system operating pressure (line 706). FIG. 8 illustrates a chart 800, which shows dosing requests over time (line 802) and the resulting pump speed (line 804) and diesel exhaust fluid system operating pressure (line 806) for a simulated off-highway operation of the system using the Non-Road Transient Cycle (NRTC) test procedure. In both FIG. 7 and FIG. 8, the pump duty cycle remains relatively constant (i.e., near idle speed) except when aggressive changes in the dosing request occur. Furthermore, the system operating pressure remains within an acceptable range of ±½ bar from the desired system operating pressure.

In some embodiments (e.g., the DEF delivery system 150), the BFDM 116 may be coupled indirectly to the fluid storage tank 108 (e.g., via the return line 152). In such embodiments, at engine off, DEF must be purged from the system, including the return line 152, to avoid the DEF solidifying in the lines and components of the DEF delivery system 150 during freezing conditions.

In some embodiments, the electronic controller provides diagnostic procedures for the BFDM 116. The operation of a DEF delivery system as described herein allows faults in the BFDM 116 to be detected hydraulically. For example, the control methods will not work correctly if the BFDM valve 116A is stuck closed, because system pressure will be too high. In the event of a stuck open BFDM valve 116A, the system will still operate as expected for lower dosing requests. However, the pressure would drop for higher dosing requests because the pump 110 would not be able to keep up.

Figure 9:
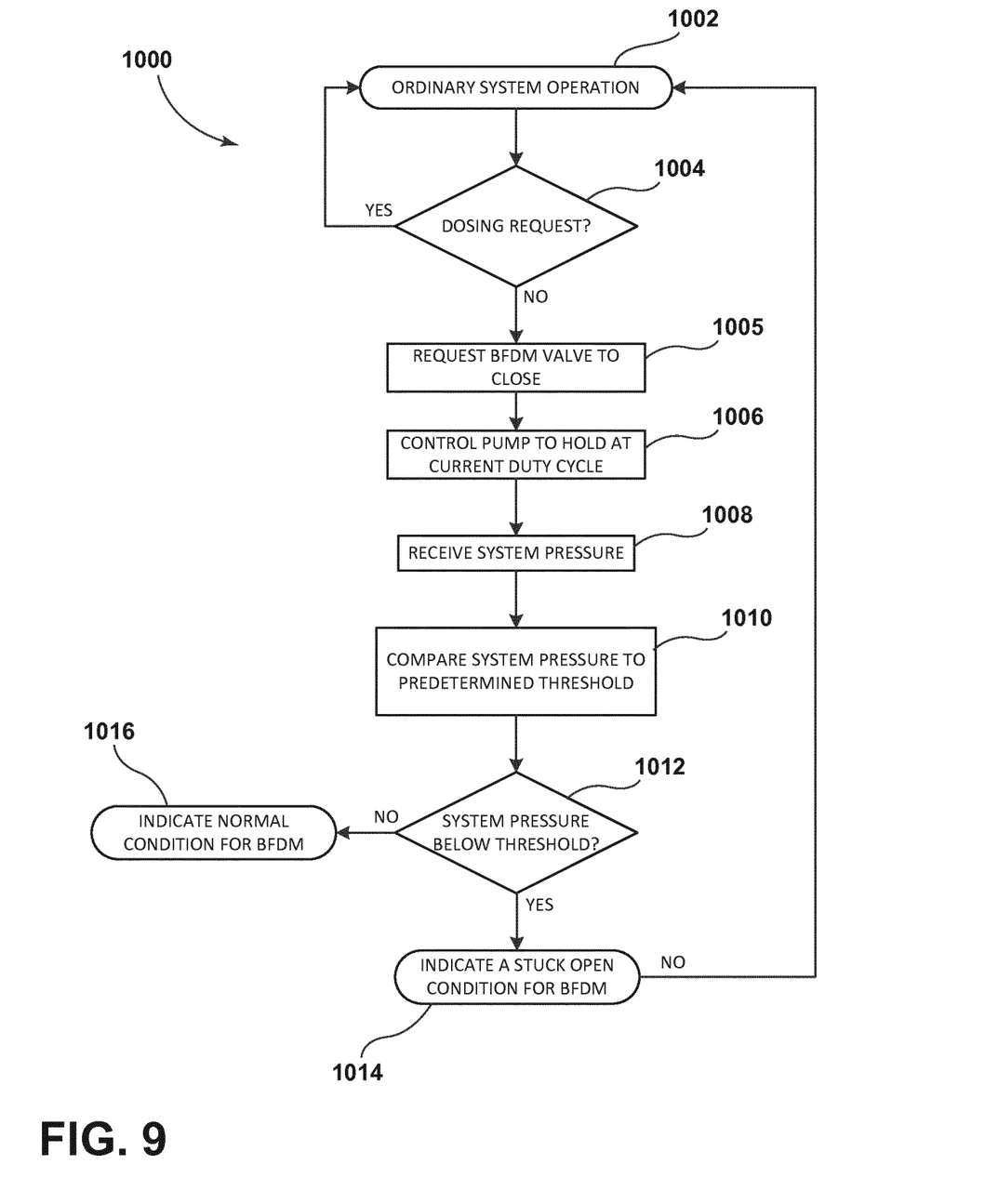
FIG. 9 is a flowchart illustrating a method for detecting a stuck valve in a diesel exhaust fluid system, according to some embodiments.

Accordingly, FIG. 9 illustrates an exemplary method 1000 for detecting a stuck open BFDM valve 116A. At block 1002, the DEF delivery system is in ordinary operation (e.g., operating according to the method 400). At block 1004, the electronic controller 122 determines whether there is a dosing request. When there is a dosing request, the electronic controller 122 continues ordinary system operation, at block 1002. At block 1005, when no dosing is requested, the electronic controller 122 sends a control request to the BFDM valve 116A to close. At block 1006, the electronic controller 122 controls the pump to hold at its current duty cycle. At block 1008, the electronic controller 122 receives the system pressure from the pressure sensor.

When the BFDM valve 116A is closed, and the duty cycle of the pump 110 is constant with no dosing request (i.e., the dosing module valves 102A, 104A remain closed), system pressure should hold or increase. Accordingly, at block 1010, the electronic controller 122 compares the system pressure to a predetermined threshold. At block 1012, when the system pressure is below the predetermined threshold, the electronic controller 122 determines that the BFDM valve 116A is open, and indicates a stuck open condition for the backflow dosing module (at block 1014). At block 1012, when the system pressure is not below the predetermined threshold, the electronic controller 122 indicates a normal condition for the backflow dosing module (at block 1016).

Thus, the invention provides, among other things, systems and methods for increasing diesel exhaust fluid delivery capacity. Various features and advantages of the invention are set forth in the following claims.

What is claimed is:

1. A diesel exhaust fluid (DEF) delivery system, the system comprising:
   a first dosing valve controllable to deliver DEF to a diesel exhaust system;
   a second dosing valve controllable to deliver DEF to the diesel exhaust system;
   a fluid storage tank for storing DEF;
   a pump, coupled to the fluid storage tank and the first and second dosing valves, and controllable to pump DEF from the storage tank through a suction line to the first and second dosing valves through a pressure line;
   a pressure sensor positioned to sense a system pressure of the DEF delivery system;
   a backflow dosing module, including a backflow dosing module valve, coupled to the fluid storage tank to controllably allow an amount of the pumped DEF to flow back into the fluid storage tank through a backflow line; and
   an electronic controller, communicatively coupled to the first and second dosing valves, the pump, the backflow dosing module, and the pressure sensor, and configured to control the pump to operate at idle speed to pressurize the pressure line;
control the first and second dosing valves to close by default;
control the backflow dosing module valve to open by default;
determine a dosing request;
determine a first dosing actuation request for the first dosing valve based on the dosing request;
determine a second dosing actuation request for the second dosing valve based on the dosing request; and
when a sum of the first and second dosing actuation requests is less than 100%,
control the first and second dosing valves to open and close based on the first and second dosing valve actuation requests;
control the backflow dosing module valve to close when either of the first and second dosing valves is open; and
control the backflow dosing module valve to open when the first dosing valve is closed and the second dosing valve is closed; and
when the sum of the first and second dosing actuation requests is greater than or equal to 100%,
receive the system pressure from the pressure sensor;
control the backflow dosing module valve to close;
determine a pressure disturbance based on the dosing request;
determine a pump control request based on the system pressure and an operating pressure;
determine a feed forward control value based on the pressure disturbance;
generate an adjusted control request based on the pump control request and the feed forward control value;
control the first and second dosing valves to open and close based on the first and second dosing valve actuation requests; and
control the pump based on the adjusted control request.

2. The system of claim 1, wherein backflow dosing module valve includes an actuator, and the electronic controller is configured to
control the backflow dosing module valve to open by energizing the actuator with a peak current for a peak period and energizing the actuator with a hold current for a hold period.

3. The system of claim 2, wherein the electronic controller is configured to energize the actuator with an open loop pulse-width modulated current.

4. The system of claim 1, wherein the electronic controller is configured to control the pump by adjusting a duty cycle of the pump based on the adjusted control request.

5. The system of claim 1, wherein the electronic controller is configured to, when the sum of the first and second dosing actuation requests is greater than or equal to 100%,
determine an anti-windup value based on the adjusted control request, an upper boundary, and a lower boundary;
determine the pump control request based on the system pressure, the operating pressure, and the anti-windup value;
generate a constrained control request based on the adjusted control request, the upper boundary, and the lower boundary; and
control the pump based on the constrained control request.

6. The system of claim 1, wherein the electronic controller is configured to, when no dosing is requested,
control the pump to hold at its current duty cycle;
request the backflow dosing module valve to close;
receive the system pressure from the pressure sensor;
compare the system pressure to a predetermined threshold; and
when the system pressure is below the predetermined threshold,
indicate a stuck open condition for the backflow dosing module.

7. A method for operating a diesel exhaust fluid (DEF) delivery system, the method comprising:
controlling, with an electronic processor, a pump to operate at an idle speed to pressurize a pressure line and pump DEF from a fluid storage tank through a suction line to a first dosing valve and a second dosing valve through the pressure line;
controlling, with the electronic processor, a backflow dosing module valve to open to allow an amount of the DEF to flow into a fluid storage tank through a backflow line;
determining a dosing request;
determining a first dosing actuation request for the first dosing valve based on the dosing request;
determining a second dosing actuation request for the second dosing valve based on the dosing request; and
when a sum of the first and second dosing actuation requests is less than 100%,
controlling the first and second dosing valves to open and close based on the first and second dosing valve actuation requests;
controlling the backflow dosing module valve to close when either of the first and second dosing valves is open; and
controlling the backflow dosing module valve to open when the first dosing valve is closed and the second dosing valve is closed; and
when the sum of the first and second dosing actuation requests is greater than or equal to 100%,
receiving a system pressure from a pressure sensor;
controlling the backflow dosing module valve to close;
determining a pressure disturbance based on the dosing request;
determining a pump control request based on the system pressure and an operating pressure;
determining a feed forward control value based on the pressure disturbance;
generating an adjusted control request based on the pump control request and the feed forward control value;
controlling the first and second dosing valves to open and close based on the first and second dosing valve actuation requests; and
controlling the pump based on the adjusted control request.

8. The method of claim 7, wherein controlling the backflow dosing module valve to open includes energizing an actuator of the backflow dosing module with a peak current for a peak period and energizing the actuator with a hold current for a hold period.

9. The method of claim 8, wherein energizing the actuator includes energizing the actuator with an open loop pulse-width modulated current.

10. The method of claim 7, wherein the electronic processor is configured to controlling the pump includes adjusting a duty cycle of the pump based on the adjusted control request.

11. The method of claim 7, further comprising:
when the sum of the first and second dosing actuation requests is greater than or equal to 100%,
determining an anti-windup value based on the adjusted control request, an upper boundary, and a lower boundary;
determining the pump control request based on the system pressure, the operating pressure, and the anti-windup value;
generating a constrained control request based on the adjusted control request, the upper boundary, and the lower boundary; and
controlling the pump based on the constrained control request.

12. The method of claim 7, further comprising:
when no dosing is requested,
controlling the pump to hold at its current duty cycle;
requesting the backflow dosing module valve to close;
receiving a system pressure from a pressure sensor;
comparing the system pressure to a predetermined threshold; and
when the system pressure is below the predetermined threshold,
indicating a stuck open condition for the backflow dosing module.

* * * * *